Dec. 21, 1948.     J. CHIZEK ET AL     2,456,863
HARVESTING MACHINE FOR ONIONS
Filed March 2, 1945

INVENTORS
JOSEPH CHIZEK
FRANK J. GAST
BY Christian R. Nielsen
ATTORNEY.

Patented Dec. 21, 1948

2,456,863

UNITED STATES PATENT OFFICE 2,456,863

HARVESTING MACHINE FOR ONIONS

Joseph Chizek, Franksville, and Frank J. Gast, Racine, Wis.

Application March 2, 1945, Serial No. 580,602

4 Claims. (Cl. 55—9)

Our invention relates to harvesting machines and more particularly to a type of machine that is employed for topping and digging onions or the like.

The object of our invention is to increase the efficiency and improve the construction of devices of this character.

Another object of our invention is to provide a means for topping the commodity such as onions or the like, excavating the onions from the soil, removing the excess soil from the onions and conveying the clean commodity by means of a conveyer from the harvesting machine.

A further object of our invention is to construct the device in a manner that will enable it to be drawn by means of a tractor or the like, or be propelled by an actuating means attached onto the device to operate its traction or drive wheels and making it possible for it to be guided manually in its course.

Figure 1:
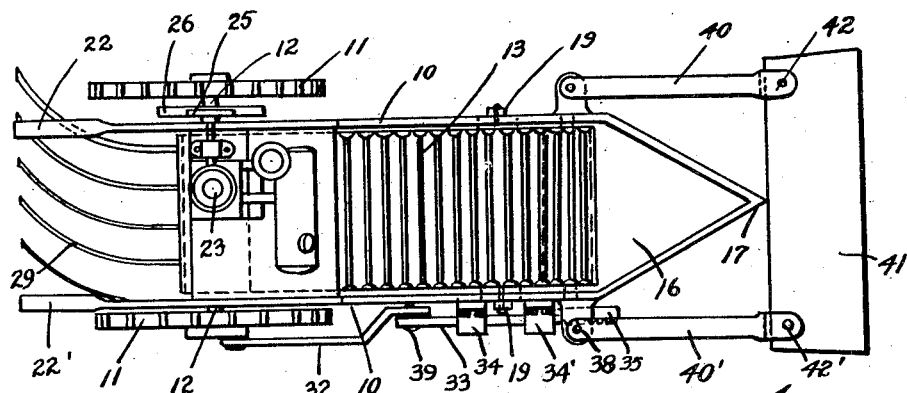
Figure 2:
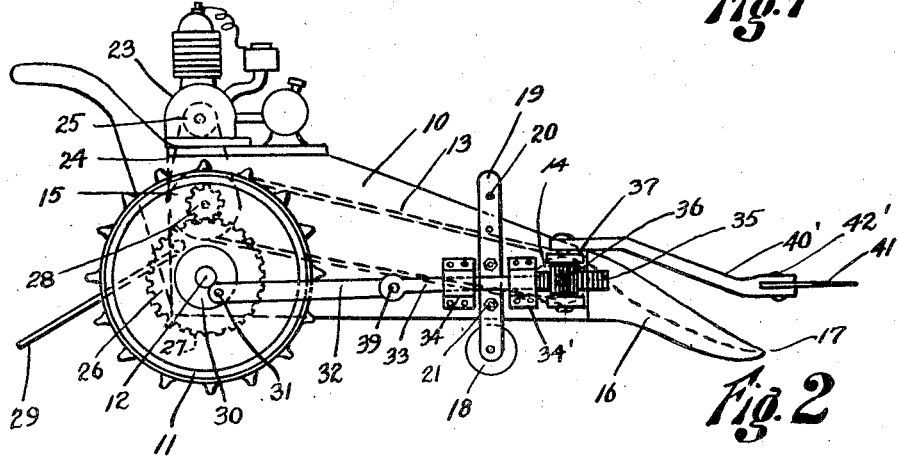
Figure 3:
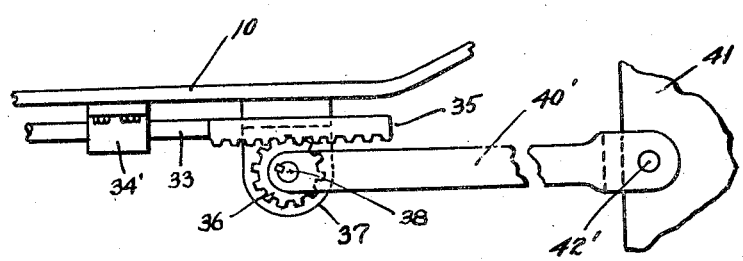

Other and further objects of our invention will become more apparent as the description proceeds when taken in conjunction with the drawings in which:

Figure 1 is a top view of the device illustrating the frame conveyor digging and topping arrangement, Figure 2 is a side view of Figure 1, and Figure 3 is a fragmentary detail of a suggested topping blade actuating mechanism.

Similar characters of reference indicate corresponding parts throughout the several views and referring now to the same the character 10 shows a frame consisting of vertical side members supported by means of traction wheels 11 journaled into said frame 10 by means of a horizontal axle 12. There is a conveyor chain 13 supported on a forward roller 14 and a rearwardly mounted roller 15 both rollers 14 and 15 respectively being mounted within the frame 10 and journaled in the side members. The front end 16 of the frame 10 has a pointed contour and is arranged for excavating the commodity such as onions from the ground. The height of the point 17 of the front end 16 from the ground is determined by the wheel 18 as held by means of the support 19 against the side members of the frame 10. This support 19 is provided with a plurality of apertures 20 which apertures are engaged by bolts 21 through the side members of the frame 10. Any other means of adjustment obviously may be employed for raising and lowering the point 17 depending on the amount of expense decided on in the construction of the device. The frame 10 is provided at its rearward end with handles 22 and 22' to be used for manual control and the entire device may be provided with an actuating means in the form of an internal combustion engine 23 as shown mounted at the top of the side members 10 and having a chain drive 24 from the sprocket 25 of the engine 23 to a sprocket 26 on the axle shaft 12 thereby causing the traction wheels 11 to rotate and the conveyor chain 13 is actuated by means of a gear 28 meshing with a gear 27 attached to the sprocket 26 causing a reverse motion. As the point 17 excavates the commodity being harvested, it is carried by means of the conveyor chain 13 toward the rearward end of the device and is deposited onto the plurality of times 29 at the rear of the device where the commodity is placed to the side of the furrow due to the radial contour of the tines 29. The axle shaft 12 is also shown provided with a crank 30 provided with a crank pin 31 and a link lever 32 operates a sliding bar 33 slidably mounted in bearings 34 and 34' to the side members of the frame 10. The extreme depending end of the sliding bar 33 is provided with a rack 35 engaging a gear 36 mounted by means of bearings 37 and a vertical shaft 38 disposed therein. The bearings 37 are also mounted to the side members of the frame 10. The link lever 32 and sliding bar 33 are hingedly connected at 39 by means of a pin. There are outwardly extended arms 40 and 40' supporting a topping blade 41. These arms 40 and 40' are attached to the vertical shaft 38 and the topping blade 41 is attached to the arms 40 and 40' by means of the swivel pins 42 and 42' as shown. As the traction wheels 11 rotate the crank 30 will cause the crank pin 31 to operate the link lever 32 thereby causing the sliding bar 33 to push the rack 35 forward and backward and inasmuch as this rack 35 engages the teeth of the gear 36 it will cause the extending arms 40 and 40' to assume a reciprocated movement sideways and in this manner the blade 41 extending as it does ahead of the point 17, will cut the tops of the onions or the like prior to their excavation. If desired means may be employed to attach the entire device to a hitch attached to the tractor or the like instead of using the actuating means as illustrated in the engine 23.

It is manifest to anyone familiar with the art that a device as illustrated will provide a very convenient and efficient means for topping the onions or the like, excavating them out of the ground, carrying them along the conveyor chain will cause the loose soil to separate from the commodity and the contour of the tines 29 will cause the onions or the like to be placed in a very definite row parallel to the trench formed by the excavating point.

Although we have shown and described a particular construction of our device it is to be understood that we can make such changes as we may deem necessary without departing from the spirit of our invention as set forth in the appended claims.

What we claim and desire to secure by Letters Patent in the United States is:

1. A device of the character described comprising a frame consisting of two vertical side members supported by cross braces, traction wheels mounted toward the rearward end of said frame, vertically adjustable wheels mounted forward on side members of said frame, an excavating point mounted at the front of said frame and extending outward therefrom, a conveyor chain journaled within said frame between said side members, said chain extending from said excavating point to the rearward end of said frame, actuating means mounted within said frame for operating said chain to convey the commodity from the excavating point rearward, a plurality of tines supported by and extending rearwardly from said frame to receive the commodity conveyed by said conveyor chain, means for employing the power from said actuating means to rotate said traction wheels, a topping blade pivotally attached to said side members and extending outward and forward from said excavating point at a slight distance above said excavating point and means for pivotally actuating said topping blade horizontally in a reciprocating manner when the traction wheels are brought into motion, said actuating means in the form of a gear and gear rack mounted to the side plates of said frame.

2. A device as described in claim 1 having guide handles extending outward and rearwardly from said frame side members for manually guiding the device in its path.

3. A harvesting machine of the character described comprising a frame consisting of a pair of vertical side members supported by cross braces, said frame supported by traction wheels rearwardly disposed, and vertically adjustable wheels forwardly disposed, said frame provided with an excavating point at its forward end, a conveyor chain mounted on sprockets supported by shafts journalled within said frame, said chain extending from said excavating point to the rear extremes of said frame and acting as a conveyor from said excavating point rearward, radially disposed tines rigidly mounted below the conveyor chain at the rearward end of said frame, a topping blade extending outward from said frame ahead of said excavating point, means operated by said traction wheels for causing a sideward reciprocated motion of said topping blade when said traction wheels are brought into motion and actuating means mounted to said frame causing said traction wheels to bring said conveyor chain and topping blade into motion.

4. A device as described in claim 3 in which the traction wheels are rigidly attached to a rotating shaft journaled within said frame, said shaft provided with a crank, said crank directly connected to a sliding gear rack by means of a link member, a gear mounted to the side of said frame, said gear engaging said gear rack and the extending arms supporting said topping blade rigidly attached to said gear causing the reciprocating action of said topping blade due to the forward and rearward action of the gear rack engaging said gears.

JOSEPH A. CHIZEK.
FRANK J. GAST.

REFERENCES CITED

The following references are of record in the file of this patent:

UNITED STATES PATENTS

| Number | Name | Date |
| --- | --- | --- |
| 318,254 | Hoover | May 19, 1885 |
| 894,675 | Lundy | July 28, 1908 |
| 1,099,407 | Swayger | June 9, 1914 |
| 1,479,929 | Ricks | Jan. 8, 1924 |
| 1,873,352 | Smith | Aug. 23, 1932 |